No. 12,228. REISSUED JUNE 7, 1904.

J. VON DER POPPENBURG.

STORAGE BATTERY ELECTRODE.

APPLICATION FILED NOV. 12, 1903.

Attest:

C. Minneton

L. B. Middleton

Inventor:

Johannes Von der Poppenburg.

by Richards & Co

Attys.

No. 12,228.

Reissued June 7, 1904.

UNITED STATES PATENT OFFICE.

JOHANNES VON DER POPPENBURG, OF CHARLOTTENBURG, GERMANY.

STORAGE-BATTERY ELECTRODE.

SPECIFICATION forming a part of Reissued Letters Patent No. 12,228, dated June 7, 1904.

Original No. 701,389, dated June 3, 1902. Application for reissue filed November 12, 1903. Serial No. 180,970.

*To all whom it may concern:*

Be it known that I, JOHANNES VON DER POPPENBURG, electrochemist, of 65 Kantstrasse, Charlottenburg, German Empire, have invented a certain new and useful Improved Storage-Battery Electrode, of which the following is an exact, full, and clear description.

This invention relates to a new kind of construction for electrical storage-battery electrodes, such construction being characterized in its essential features by the fact that the cross-pieces adapted for dividing or separating the active material protrude from the frame on both sides and are provided with holes at the part protruding from the frame, through which holes pass elastic bars which press or bear against the protecting-strips that prevent the active material from dropping off. The advantage obtained thereby is that any expansion of the active material only produces a corresponding bending of the elastic bars, whereas a cracking of the protecting covering or the formation of a wide crack or crevice is perfectly excluded.

Figure 1:
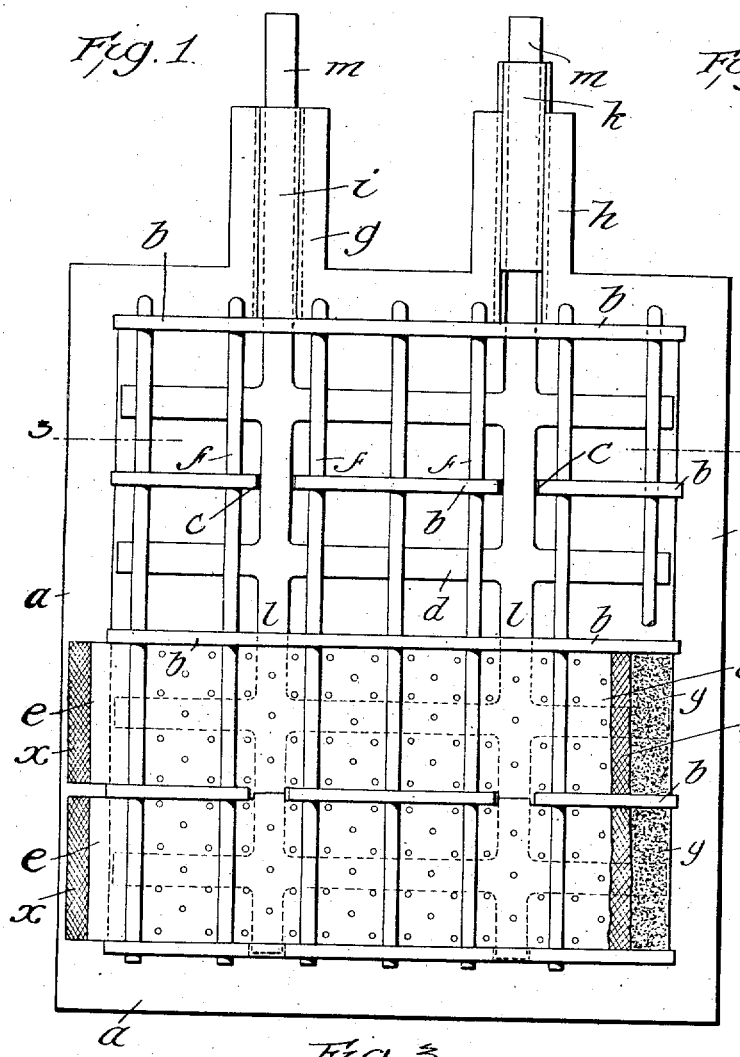
Figure 2:
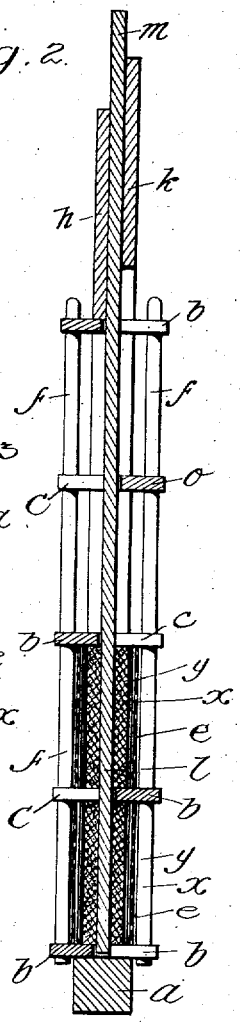
Figure 3:
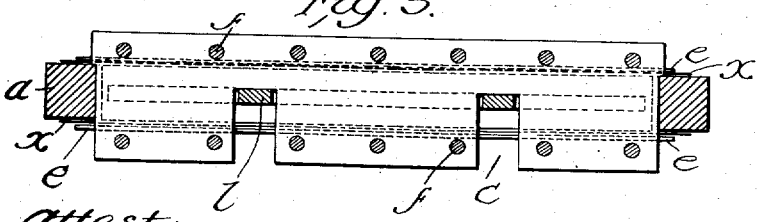

Referring to the accompanying drawings, Figure 1 is an elevation of the electrode. Figs. 2 and 3 are vertical and horizontal sections, respectively, Fig. 2 being taken on line 3 3 of Fig. 1.

The vertical sides of the ebonite frame *a* are provided with grooves at suitable distances apart, in which the ends of the ebonite pieces *b* are inserted. The latter are so wide that they protrude from the frame *a* on both sides. The protruding parts of the cross-pieces are provided with holes, through which the ebonite bars *f* are inserted. When making the electrode, the ebonite bars *f* are first inserted on the one side through the holes of the cross-pieces, and then protecting-strips *e*, consisting of thin fine perforated ebonite plates, are put into the compartments. Strips of felt *x* are preferably inserted at the same time as the perforated protecting-plates *e*. A sufficient quantity or layer of active material *y* is placed thereon, which is covered by the lattice *d*. The latter is again supplied with active material *y* up to the height of the frame. After putting thereon strips of felt and perforated protecting-plates *e* the ebonite bars *f* are also on this side finally inserted through the holes of the cross-pieces *b*.

In the above-described construction of the accumulator the cross-pieces *b* must all be provided on one side with deep recesses *c* for receiving the vertical latticed pieces *l*. After inserting the lattice or grid *d* the recesses must then be closed outwardly in a suitable manner.

It is preferable to act in such a manner that in the first place cross-pieces *b* are inserted only from one side of the frame, then the lattice is put into the recesses provided for it in the cross-pieces, and finally the remaining cross-pieces, which are likewise provided with deep recesses, are inserted from the other side of the frame, as shown in Fig. 2. In this manner the lattice is made more secure and also the warping of same is most effectively prevented.

The perforated protecting-plates *e* are preferably supported in such a manner that they also cover the orifices produced by the recesses at the edge of the cross-pieces *b*.

The frame is provided above with the projections or lugs *g* and *h*, which have recesses for receiving the current-conductor *m*. The recesses are so constructed that it is possible to insert correspondingly-formed ebonite slides *i* and *k*, so that the current-conductor is fully protected against damage on the part of the electrolyte.

The herein-described construction has the advantage that notwithstanding the grid shape of the lattice it allows of the lattice when it has become inoperative being readily replaced without disturbing the main part of the formed material. For this purpose the ebonite bars *f* on both sides are removed, whereupon the electrode, with the slides *i* and *k*, is placed above upon a suitable support. The perforated protecting-plates, which are located above, are lifted off, along with the strips of felt belonging thereto, the cross-pieces *b*, which are inserted from this side, are drawn out, the slides *i* and *k* removed, and the formed material, which is located across the lattice, is cut out in strips corresponding to the lattice. The damaged lattice can then be replaced by a new one. After the insertion of a new lattice the strips of formed material which were previously cut out are reinserted and the other removed parts again put in their places.

The insertion of a new lattice is made more simple if the cross-pieces *b* are inserted alternately from different sides. In this case only those cross-pieces need be removed again that were inserted from the side at which the slides *i* and *k* are located.

Having now particularly described and ascertained the nature of the said invention, I declare that what I claim, and wish to secure by Letters Patent, is—

An improved storage-battery electrode comprising a non-conducting frame independently removable cross-pieces of non-conducting material carried by the frame and having perforated portions projecting on each side thereof, perforated protecting-strips, active material interposed between said strips, and removable vertical elastic bars held in said perforations in the cross-pieces adapted to press the protecting-strips against the active material, substantially as described.

In witness whereof I have hereunto set my hand in the presence of two witnesses.

JOHANNES VON DER POPPENBURG.

Witnesses:
HENRY HASPER,
WOLDEMAR HAUPT.